(12) United States Patent
O'Dwyer

(10) Patent No.: US 7,117,779 B1
(45) Date of Patent: Oct. 10, 2006

(54) DRIVER FOR POWER TOOLS

(75) Inventor: James Michael O'Dwyer, Brisbane (AU)

(73) Assignee: Metal Storm Limited, Brisbane (AU)

( * ) Notice: Subject to any disclaimer, the term of this patent is extended or adjusted under 35 U.S.C. 154(b) by 771 days.

(21) Appl. No.: 10/130,673

(22) PCT Filed: Nov. 23, 2000

(86) PCT No.: PCT/AU00/01425

§ 371 (c)(1),
(2), (4) Date: Sep. 30, 2002

(87) PCT Pub. No.: WO01/38046

PCT Pub. Date: May 31, 2001

(30) Foreign Application Priority Data

Nov. 23, 1999 (AU) .............................................. PQ4200

(51) Int. Cl.
B25C 1/10 (2006.01)

(52) U.S. Cl. .......................... 89/1.14; 102/531; 227/10; 173/135

(58) Field of Classification Search .................. 89/1.14; 102/531; 227/10, 9; 173/135
See application file for complete search history.

(56) References Cited

U.S. PATENT DOCUMENTS

| | | | | |
|---|---|---|---|---|
| 3,485,431 A | * | 12/1969 | Wackrow | 227/10 |
| 4,063,672 A | * | 12/1977 | Jochum | 227/10 |
| 4,066,198 A | * | 1/1978 | Jochum et al. | 227/8 |
| 4,113,163 A | | 9/1978 | Combette et al. | |
| 5,196,647 A | * | 3/1993 | Majors | 102/303 |
| 5,429,291 A | * | 7/1995 | Thompson | 227/10 |
| 5,767,434 A | * | 6/1998 | Hirtl et al. | 89/1.14 |
| 5,842,623 A | * | 12/1998 | Dippold | 227/10 |
| 6,062,455 A | * | 5/2000 | Giannuzzi et al. | 227/10 |

FOREIGN PATENT DOCUMENTS

| | | |
|---|---|---|
| AU | 199948863 | 11/1999 |
| AU | 200037935 | 8/2000 |
| DE | 3802018 | 8/1989 |
| FR | 2 585 769 | 2/1987 |
| WO | WO 97/04281 * | 2/1997 |
| WO | 98/55819 | 12/1998 |

* cited by examiner

Primary Examiner—Michael J. Carone
Assistant Examiner—Gabriel S Sukman
(74) Attorney, Agent, or Firm—Finnegan, Henderson, Farabow, Garrett & Dunner LLP

(57) ABSTRACT

A power source (10) for providing energy to drive a mechanical device including a receiving chamber (11) and discrete propellant charges (23) for selective detonation whereby gases generated by the selective detonation expand into the receiving chamber (11) wherein said receiving chamber includes a reactive closure (15) which dynamically responds to pressure changes in the receiving chamber and wherein said power source further includes a linkage (16) associated with the reactive closure for transmitting energy from the dynamic response of the reactive closure to the mechanical device.

21 Claims, 3 Drawing Sheets

DRIVER FOR POWER TOOLS

Figure 1:
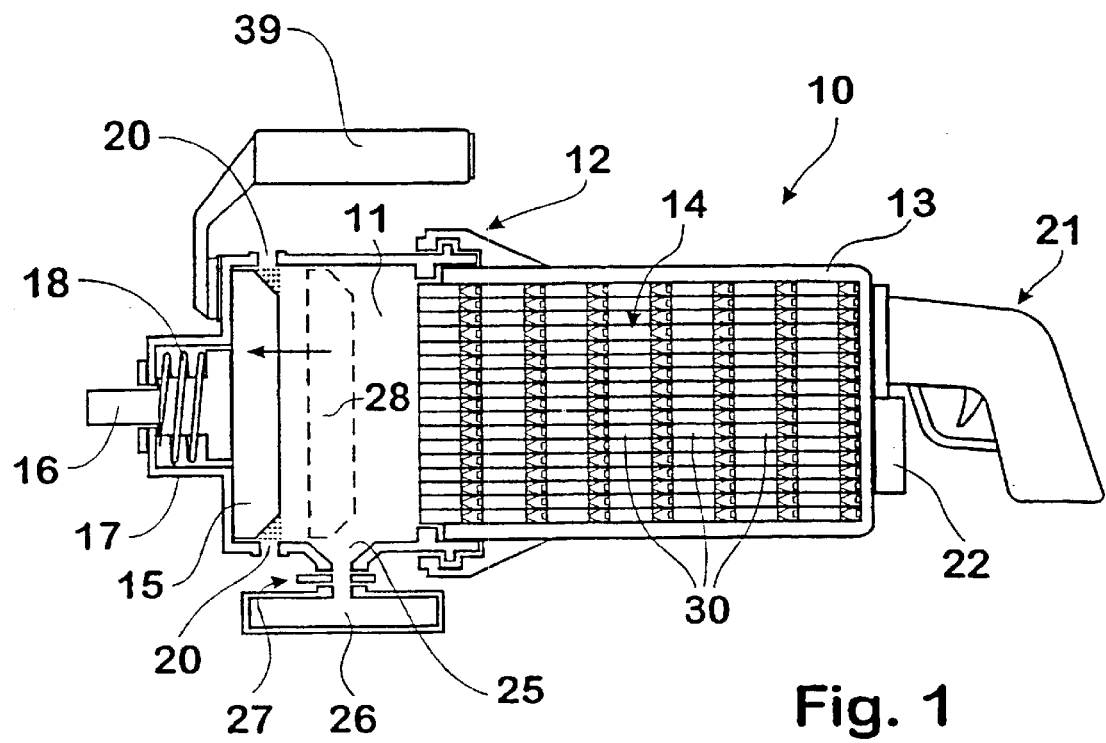

This invention relates to a power source for providing energy to drive various mechanical devices such as power tools. This invention also relates to power tools and to a method of providing energy to drive power tools.

The present invention, at least in so far as it relates to a power source, will be described hereunder for use in providing energy to drive power tools although it will be understood that the power source may be used to provide energy to other mechanical devices.

Power tools may be driven by a variety of power sources. For example continuous power may be provided by electricity and air driven motors. Electric and air powered motors need to be connected to an electricity or air supply respectively. Whilst batteries and compressed air packs may provide a portable power supply, generally such portable power supplies cannot provide the power necessary for applications requiring large amounts of energy to be delivered over a short period of time. These motors, as well as linear actuators, may be utilised to drive power tools requiring intermittent power such as nail guns, power chisels and the like. Some nails guns have also been powered by explosive cartridges. However the use of explosive cartridges are not particularly suited where prolonged repetitious use is required as frequent reloading of the cartridges is required.

We have now found a power source that may be used to drive various mechanical devices such as power tools and is readily portable and capable of delivering relatively high power. According to the present invention there is provided a power source for providing energy to drive a mechanical device including a receiving chamber and discrete propellant charges for selective detonation whereby gases generated by the selective detonation expand into the receiving chamber wherein said receiving chamber includes a reactive closure which dynamically responds to pressure changes in the receiving chamber and wherein said power source further includes a linkage associated with the reactive closure for transmitting energy from the dynamic response of the reactive closure to the mechanical device.

The power source includes a receiving chamber into which the gases generated by the detonation of the propellant may expand. The receiving chamber accommodates the expanded gases and will withstand the pressures generated. The receiving chamber may be constructed out of any suitable material that can retain the expanded gases without substantial deformation in order that the energy released by the detonation of the propellant is transferred to the reactive closure. Suitably the receiving chamber may be constructed from cast metals including aluminium and steel or from reinforced plastics materials.

The discrete propellant charges may preferably be contained in one ore more cartridges of the type described in International Patent Application Nos. PCT/AU94/00124 and PCT/AU96/00459. Such cartridges includes a shell; a plurality of separator projectiles axially disposed within the shell for operative sealing engagement with the bore of the tubular shell, and discrete propellant charges.

The projectile separator may be of any convenient shape to provide sealing engagement with the bore of the shell and permit the selective detonation of the propellant charges.

The propellant charge may be form as a solid block or the propellant charge may be encased in metal or other rigid case which may include an embedded primer having external contact means adapted for contacting an pre-positioned electrical contact associated with the case. For example the primer could be provided with a sprung contact which may be retracted to enable insertion of the cased charge into the shell and to spring out into an aperture upon alignment with that aperture for operative contact with its mating shell contact. If desired the case may be consumable or may chemically assist the propellant burn.

Each projectile separator may include a head and extension means for at least partly defining a propellant space. The extension means may include a spacer assembly that extends rearwardly from the projectile head and abuts an adjacent projectile assembly.

The spacer assembly may extend through the propellant space and the projectile head whereby compressive loads are transmitted directly through abutting adjacent spacer assemblies. In such configurations, the spacer assembly may add support to the extension means that may be a thin cylindrical rear portion of the projectile head. Furthermore the extension means may form an operative sealing contact with the bore of the shell to prevent burn leakage past the projectile head.

The spacer assembly may include a rigid collar which extends outwardly to engage a thin cylindrical rear portion of the malleable projectile head inoperative sealing contact with the bore of the shell such that axially compressive loads are transmitted directly between spacer assemblies thereby avoiding deformation of the projectile spacer.

Complementary wedging surfaces may be disposed on the spacer assembly and projectile spacer head respectively whereby the projectile spacer head is urged into engagement with the bore of the shell in response to relative axial compression between the spacer means and the projectile spacer head. In such arrangement the projectile spacer head and spacer assembly may be loaded into the barrel and there after an axial displacement is caused to ensure good sealing between the projectile spacer head and barrel. Suitably the extension means is urged into engagement with the bore of the barrel.

The projectile head may define a tapered aperture at its rearward end into which is received a complementary tapered spigot disposed on the leading end of the spacer assembly, wherein relative axial movement between the projectile spacer head and the complementary tapered spigot causes a radially expanding force to be applied to the projectile spacer head.

The shell may be non-metallic and the bore of the shell may include recesses which may fully or partly accommodate the ignition means. In this configuration the shell houses electrical conductors which facilitate electrical communication between the control means and ignition means. This configuration may be utilised for disposable shell assemblies which have a limited firing life and the ignition means and control wire or wires therefor can be integrally manufactured with the shell.

A cartridge may alternatively include ignition apertures in the shell and the ignition means are disposed outside the shell and adjacent the apertures. The shell may be surrounded by a non-metallic outer shell which may form the sleeve which may include recesses adapted to accommodate the ignition means. The outer shell may also house electrical conductors which facilitate electrical communication between the control means and ignition means. The outer shell may be formed as a laminated plastics shell which may include a printed circuit laminate for the ignition means.

The cartridge may have adjacent propellant charges that are separated from one another and maintained in spaced apart axial relationship by locating means separate from the projectile spacers, and each projectile spacer may include an expandable sealing means for forming an operative seal with the bore of the shell. The locating means may be the propellant charge between adjacent projectile spacers and the sealing means suitably includes a skirt portion on each projectile spacer that expands outwardly when subject to an in-shell load. The in-shell load may be applied during installation of the projectile spacer or after loading such as by tamping to consolidate the column of projectile spacers and propellant charges or may result from the firing of an outer propellant charge and particularly the adjacent outer propellant charge.

The rear end of the projectile spacer may include a skirt about an inwardly reducing recess such as a conical recess or a part-spherical recess or the like into which the propellant charge portion extends and about which rearward movement of the projectile spacer will result in radial expansion of the projectile skirt. This rearward movement may occur by way of compression resulting from a rearward wedging movement of the projectile spacer along the leading portion of the propellant charge it may occur as a result of metal flow from the relatively massive leading part of the projectile spacer to its less massive skirt portion.

Alternatively the projectile spacer may be provided with a rearwardly divergent peripheral sealing flange or collar which is deflected outwardly into sealing engagement with the bore upon rearward movement of the projectile spacer. Furthermore the sealing may be effected by inserting the projectile spacer into a heated shell which shrinks onto respective sealing portions of the projectile spacers. The projectile spacer may comprise a relatively hard mandrel portion located by the propellant charge and which cooperates with a deformable annular portion may be moulded about the mandrel to form a unitary projectile spacer which relies on metal flow between the nose of the projectile spacer and its tail for outward expansion about the mandrel portion into sealing engagement with the bore of the shell.

The projectile spacer may include a rearwardly expanding anvil surface supporting a sealing collar thereabout and adapted to be radially expanded into sealing engagement with the shell bore upon forward movement of the projectile spacer through the shell. In such a configuration it is preferred that the propellant charge have a cylindrical leading portion which abuts the flat end face of the projectile spacer.

The electrical ignition for sequentially igniting the propellant charges of a barrel assembly may preferably include the steps of igniting the leading propellant charge by sending an ignition signal through the stacked projectiles, and causing ignition of the leading propellant charge to arm the next propellant charge for actuation by the next ignition signal. Suitably all propellant charges inwardly from the end of a loaded shell are disarmed by the insertion of respective insulating ruses disposed between normally closed electrical contacts.

Ignition of the propellant may be achieved electrically. In another form the ignition is electronically controlled with respective propellant charges being associated with primers which are triggered by distinctive ignition signals. For example the primers in the stacked propellant charges may be sequenced for increasing pulse width ignition requirements whereby electronic controls may selectively send ignition pulses of increasing pulse widths to ignite the propellant charges sequentially in a selected time order. Preferably however the propellant charges are ignited by a set pulse width signal and burning of the leading propellant charge arms the next propellant charge for actuation by the next emitted pulse.

Suitably in such embodiments all propellant charges inwardly from the end of a loaded barrel are disarmed by the insertion of respective insulating fuses disposed between insertion of respective insulating fuses disposed between normally closed electrical contacts, the fuses being set to burn to enable the contacts to close upon transmission of a suitable triggering signal and each insulating fuse being open to a respective leading propellant charge for ignition thereby.

The propellant charges are selectively detonated to pressurise the receiving chamber. In certain applications one detonation will correspond to one actuation of the mechanical device or power tool, such as for example with a power chisel or the like. In other applications the actuation of the mechanical device or power tool may rely on the pressure in the receiving chamber being above a preset value and once the pressure drops below a predetermined value a further propellant charge is detonated to maintain the pressure above the preset value. In such applications the trigger mechanism controls the mechanical device or power tool and the propellant charges are automatically detonated.

The reactive closure may be a diaphragm or it may be a piston slidably and sealably engaged in the receiving chamber or a portion thereof. The diaphragm may be a flat or a bellows type diaphragm which may be resilient so as to return the diaphragm to a datum position after reacting. The diaphragm may be biased to the datum position by any suitable means such as by spring or gas chamber biasing.

The receiving chamber may collect the spent matter such as the separator projectiles or other debris associated with detonation of the explosive/propellant charge or the spent matter may be discharged, suitably through a valve arrangement which remains closed while the expanding explosive/propellant works against the reactive closure.

In one form the receiving chamber is detachably secured to a cartridge of barrel assemblies. The actuating means for selectively firing each or a selected number of projectiles either simultaneously or in series, whereby the operating force of, or duration of operation of the operating member may be selectively varied. The actuating means may be associated with the removable cartridge or the receiving chamber. The cartridge may be a reloadable cartridge or a one-use throw-away cartridge.

The linking means may be a plunger which moves with the reactive member. Alternatively, the linking means may be a rocker or it may be a fluid pump or other transducer actuated by the reactive member.

The transducer may also be adapted to transmit a continuous torque to the mechanical device or power tool or a combination of a linear force and torque such as may be employed in a hammer drill or the like.

Advantageously, the present invention provides a power source which may be employed in a variety of power tools such as hammer chisels, drills, hammer drills, saws, routers, angle grinders, sanders including belt sanders and vibrating sanders, nail guns, horticultural and agricultural machines such as chain saws, shredders, garden edgers, hedge trimmers and other cutting implements, mixing apparatus, planers, concrete hammers, grinders, polishers, nut runners, tappers, hammers, rammers and the like.

Figure 2:
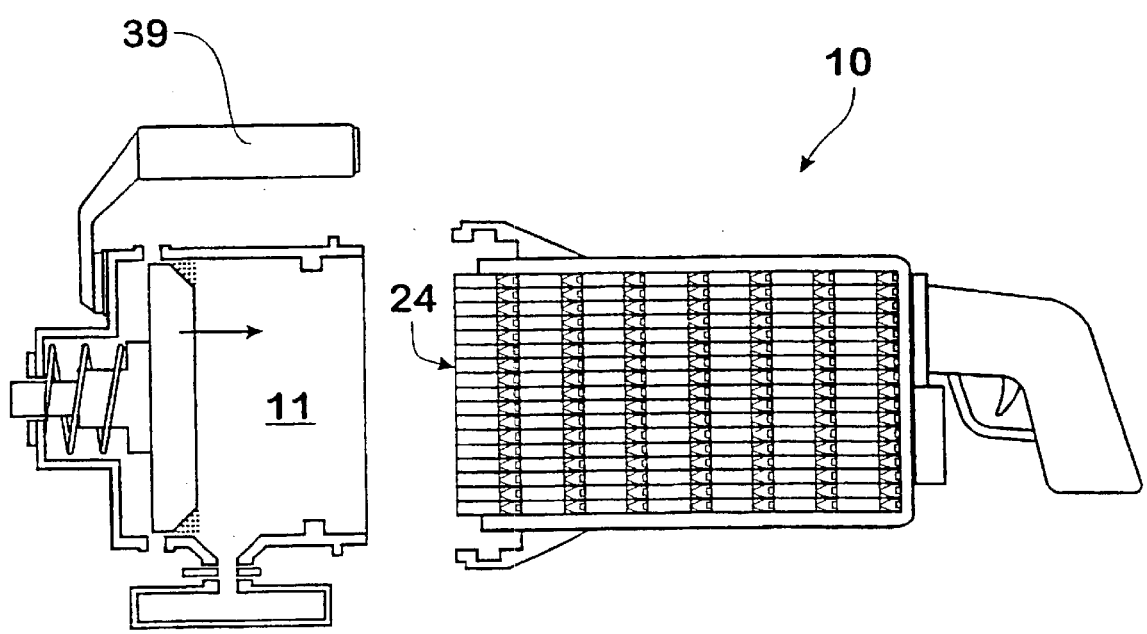
Figure 3:
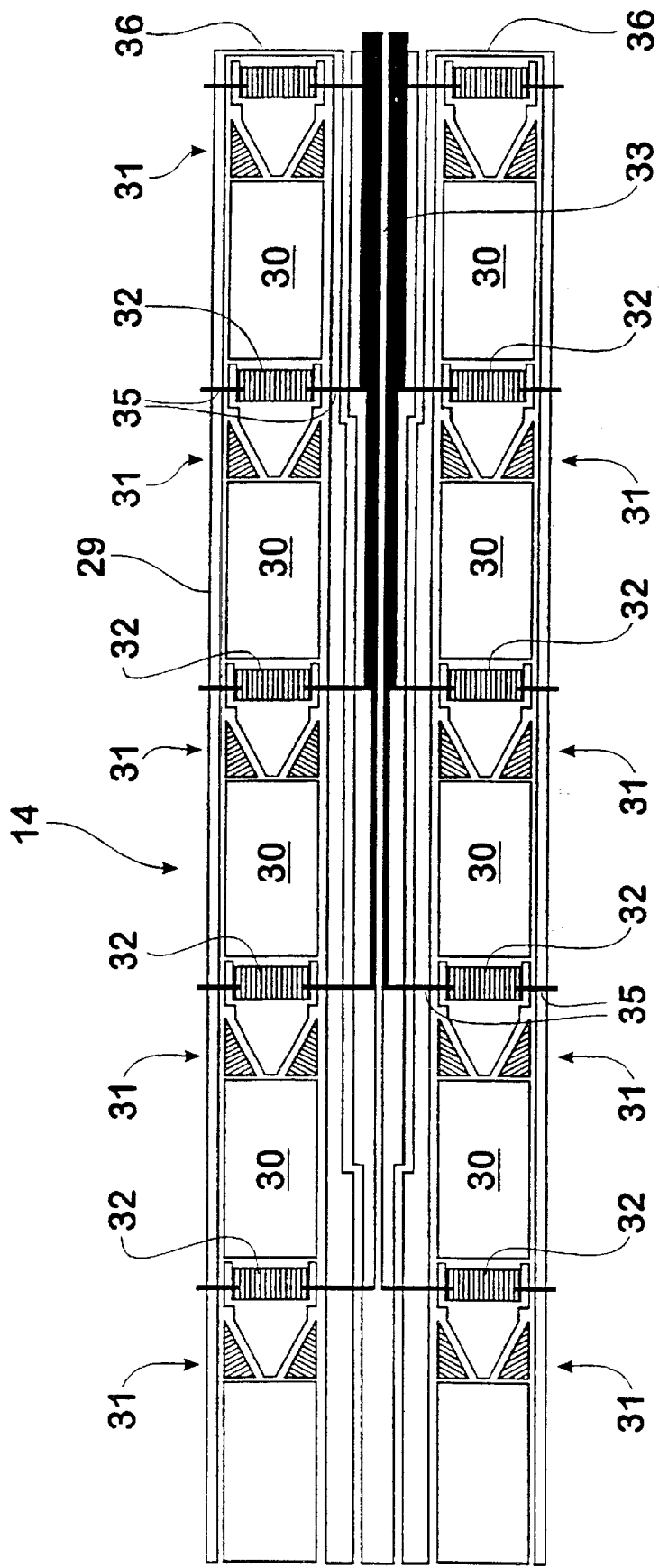

In order that this invention may be more readily understood and put into practical effect, reference will now be made to the accompanying drawings which illustrate a typical embodiment of the invention, wherein:

FIG. 1 is a diagrammatic cross-sectional view of a power source for a power tool;

FIG. 2 corresponds to FIG. 1 but illustrates the head portion separated from the cartridge portion FIG. 3 is a typical sectional view of a cluster of two barrel assemblies.

Figure 4:
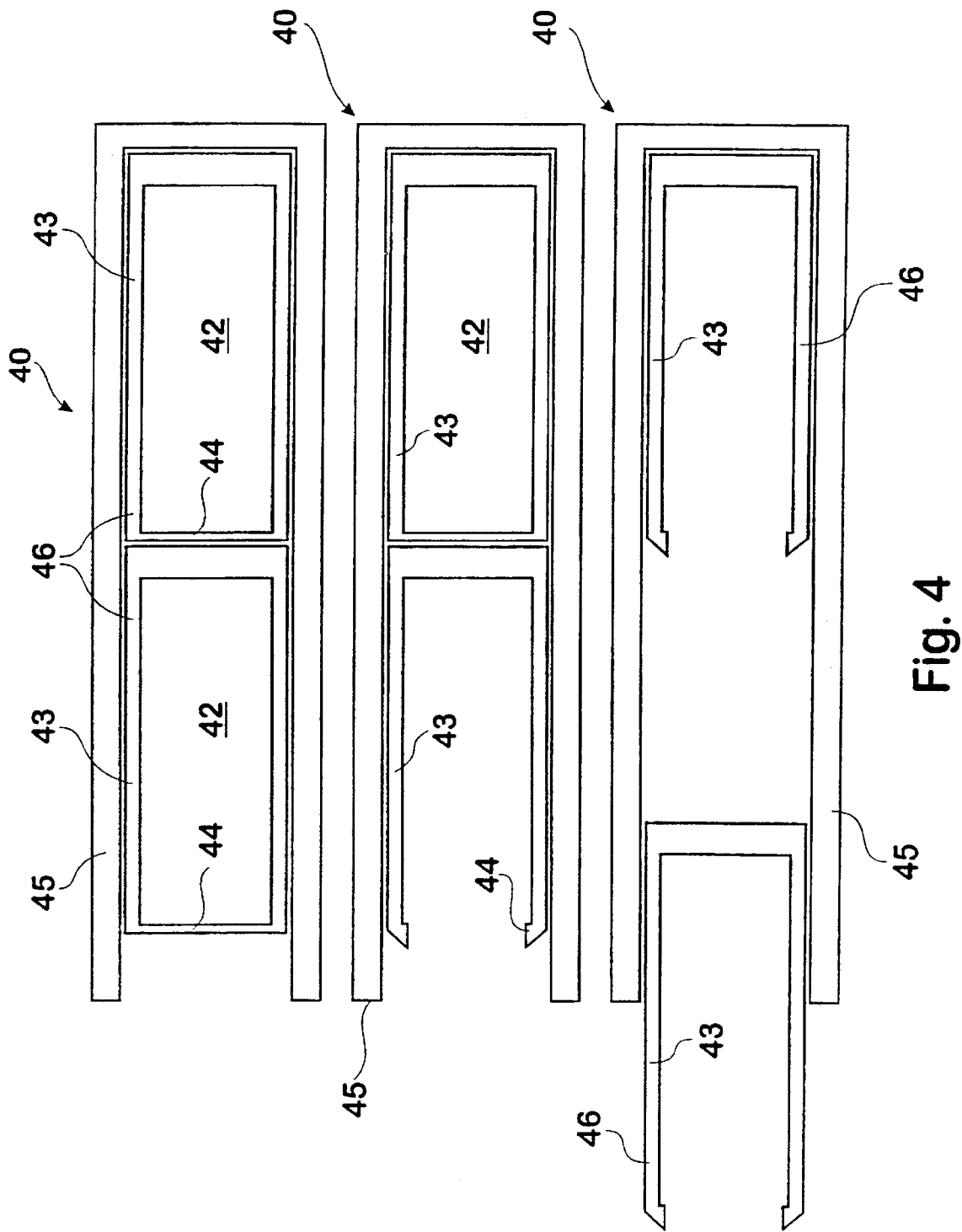

FIG. 4 is a sectional view of three barrel assemblies.

The driver 10 illustrated in FIG. 1 has a receiving expansion chamber 11 formed with a bayonet type connection 12 at its trailing end for connection to a cartridge case 13 which contains a cluster of barrel assemblies 14. A reactive piston 15 is sealably and slidably supported in the front end portion of the receiving expansion chamber 11. The piston 15 is guided for movement through the receiving expansion chamber 11 by a plunger 16 guided for reciprocal movement in an extension housing 17.

A biasing spring 18 is supported in the extension housing 17 for biasing the piston 15 to a retracted position as illustrated in FIG. 2. In this position the piston closes exhaust ports 20 provided in the receiving expansion chamber 11. A trigger operated actuating handle 21 is shown connected to the cartridge case 13 along with adjustable controls, generally shown at 22, which may be manually set to achieve the desired firing configuration required.

For example the control may be set to fire a single explosive/propellant charge 30 with each operation of the trigger or it may simultaneously fire a selected number of propellant charges 30 from the leading rounds of charges 30 in the barrels 14. Alternately the control may be set to fire a series of explosive/propellant charges 30 from one or a plurality of barrels and at a rate which provides a prolonged or increased pressurization of the receiving expansion chamber 11. It will be seen that the rear open end of the receiving expansion chamber 11 communicates with the open front end 24 of each of the barrel assemblies 14 which fire directly into the receiving chamber towards the piston 15.

A funnel shaped outlet 25 is provided at the base of the chamber 11 leading to a collection container 26 through a gate valve 27. Spent separator projectiles or other debris may pass into the collection container 26 through the gate valve 27 which may be manually controlled or it may be linked to the plunger 16 for automatic opening such as on the return stroke of the plunger 16 as illustrated in FIG. 2.

Upon firing a selected charge 30 the pressure within the receiving chamber from expansion of the explosive/propellant charge 30 will force the piston 15 forwardly from position 28, illustrated in dotted outline in FIG. 1, until the piston 15 passes beyond the exhaust ports 20 enabling spent propellant gases to escape.

Referring to FIG. 3 it will be seen that each barrel assembly 14 has a plurality of spaced charges 30 separated by a two-part separator projectiles 31 each of which contains a primer 32. Each primer 32 makes an electrical connection with a respective control conductor 33 supported in an insulated configuration in the space between adjacent barrel assemblies 14 whereby their ignition may be controlled by electronics in the controls 22.

It will also be seen from FIG. 3 that the conductors 33 all lead from respective contacts 35 rearwardly and beyond the closed end 36 of each barrel assembly so that they exit to the control mechanism 22 as a bunch of insulated or separated conductors.

Each separator projectile 31 includes a flat nose portion 50 which has a rearwardly diverging conical opening 51 therethrough to receive a complementary tapered leading portion 52 of a trailing part 53 which supports the primer 32. The projectiles 31 may be formed from aluminium or other lightweight material including a suitable plastics or ceramic material and as in our previously described International Applications, the projectile relies on a radial expansion of the nose portion 50 through relative axial engagement between the nose portion 50 and the complementary trailing part 53 to effect a sealing engagement with its barrel 29.

For this purpose each propellant charge 30 is in the form of a solid block so as to support the trailing part 53 fixedly in a stacked position in the barrel 14.

In use, when a charge 30 is fired from a barrel assembly 11, it exits the barrel and enters the receiving expansion chamber 11 and creates a sudden pressure increase in the receiving chamber 11 causing the piston 15 to move forwardly, actuating the plunger 16 until the exhaust ports 20 are cleared allowing the propellant charge to exhaust to atmosphere and the piston 15 to return to its retracted position under the influence of the return spring 16.

Movement of the plunger 16 is used to actuate the power tool or appliance as required. For this purpose the front end of the driver 10 may be provided with a connector for connecting it to a- power tool to provide the necessary drive therefore. A support handle 39 is provided. Typically this would be positioned at a point of balance appropriate for the power tool to be used with the driver.

It will be seen that the charges 30 are relatively large compared to the separating projectiles 31 which in effect operate only as seals between the propellant charges 30. The kinetic energy of each projectile 31 upon firing is not utilized in actuating the plunger 16. The charges 30 may be varied in size or type depending upon the power characteristics required from the plunger 16.

The separating projectiles may be retained in position in the barrel by any suitable means such as by being located against internal locating ribs or grooves in the barrel or by circlips or spines extending between the separator projectiles 31. Furthermore reverse wedging may also be used as disclosed in our earlier patent applications.

Referring to the barrel assembly 40 illustrated in FIG. 4 it will be seen that each propellant charge 42 is encased in a plastic tube-like casing 43 which has a weakened front wall 44 to permit expanding gas from the propellant detonation to pass forwardly through the barrel 45 and into the receiving expansion chamber 11. At the same time the limited resilience of the tubular wall 46 of the casing 43 will cause it to expand into tight sealing engagement with the barrel 45 preventing bypass of the gases to the trailing propellant charge in sufficient quantities to cause ignition of that encased trailing charge 30. The spent casing 43 will impact and compress against the back face of the piston or other closure of the expansion chamber 11. The initiation means for detonating the propellant charges 42 may be via an external barrel mounted primer or be achieved electrically through spaced annular contacts extending about the casing 43 and contacting respective sets of contacts in the barrel 45. As illustrated the front wall 44 of the casing 43 is relatively thin so that it will be easily ruptured by detonation of the propellant 42 for propelling the preceding projectile 21 from the barrel.

It will of course be realised that the above has been given only by way of illustrative example of the invention and that all such modifications and variations thereto as would be apparent to persons skilled in the art are deemed to fall within the broad scope and ambit of the invention as is herein set forth.

What is claimed is:

1. A power tool driver comprising;
   a receiving chamber;
   a number of barrels, each barrel containing a plurality of discrete propellant charges for selective detonation whereby gases generated by the detonation of the propellant charge expand into the receiving chamber;

a reactive closure positioned in the receiving chamber which dynamically responds to the pressure changes in the receiving chamber; and a linkage associated with the reactive closure for transmitting energy from the dynamic response of the reactive closure to the power tool.

2. The driver according to claim 1, wherein the discrete propellant charges are contained in one of more cartridges including a tubular shell, a plurality of separator projectiles axially disposed within the shell for operative sealing engagement with the bore of the tubular shell.

3. The driver to claim 1, wherein the propellant charge is in the form of a solid block.

4. The driver according to claim 1, wherein the detonation is electronically controlled with respective propellant charges being associated with primers which are triggered by distinctive ignition signals.

5. The driver according to claim 1, wherein the reactive closure is a diaphragm or a piston sealably engaged with the receiving chamber.

6. The driver according to claim 5, wherein the diaphragm or piston is biased to a datum position.

7. The driver according to claim 1, wherein the receiving chamber is detachably secured to a cartridge of barrel assemblies containing propellant charges.

8. The driver according to claim 1, wherein the linking means is selected from the group consisting of a plunger, a rocker, a fluid pump and a transducer.

9. The driver according to claim 1, wherein the propellant charge is encased in a rigid case.

10. The driver according to claim 7, wherein the cartridge contains a cluster of barrel assemblies each containing a plurality of spaced charges separated by a respective projectile.

11. The driver according to claim 10, wherein the projectiles each comprise two-part separator projectile containing a primer.

12. A driver according to claim 1, the detonation of propellant being adapted to move the reactive closure from a retracted position to an extended position.

13. A driver according to claim 12, the receiving chamber including a number of exhaust ports which allow gases to be expelled from the receiving chamber when the reactive closure is in the extended position.

14. A driver according to claim 12, the driver including a spring for urging the reactive closure from the extended position to the retracted position.

15. A driver according to claim 1, each barrel defining a barrel axis, and each barrel including a number of axially aligned projectiles.

16. A driver according to claim 1, the driver including a control mechanism, the control mechanism being electrically coupled to a primer associated with each propellant charge, the control mechanism selectively igniting the primers to thereby selectively detonate the propellant charges.

17. A driver according to claim 16, the control mechanism igniting the primers with distinctive electronic signals.

18. A driver according to claim 16, the control mechanism simultaneously firing propellant charges from a number of barrels.

19. A driver according to claim 1, the propellent charges being spaced by spacer projectiles, the spacer projectiles including complimentary wedge shaped portions adapted to form a seal with the barrel in response to the firing of a preceding propellant charge.

20. A driver according to claim 1, the receiving chamber being adapted to receive debris from the detonation of the propellant charges.

21. A driver according to claim 20, the receiving chamber including a collection chamber and a gate valve arranged such that debris in the receiving chamber passes through the gate valve into the collection chamber.

* * * * *